(12) United States Patent
Kozakevich

(10) Patent No.: US 12,525,435 B2
(45) Date of Patent: Jan. 13, 2026

(54) RF MAGNETIC FIELD SENSOR FOR HARMONIC MEASUREMENTS AND UNIFORMITY CONTROL

(71) Applicant: Lam Research Corporation, Fremont, CA (US)

(72) Inventor: Felix Leib Kozakevich, Sunnyvale, CA (US)

(73) Assignee: Lam Research Corporation, Fremont, CA (US)

( * ) Notice: Subject to any disclaimer, the term of this patent is extended or adjusted under 35 U.S.C. 154(b) by 286 days.

(21) Appl. No.: 17/912,825

(22) PCT Filed: Mar. 19, 2021

(86) PCT No.: PCT/US2021/023246
§ 371 (c)(1),
(2) Date: Sep. 19, 2022

(87) PCT Pub. No.: WO2021/202129
PCT Pub. Date: Oct. 7, 2021

(65) Prior Publication Data
US 2023/0178337 A1    Jun. 8, 2023

Related U.S. Application Data

(60) Provisional application No. 63/003,180, filed on Mar. 31, 2020.

(51) Int. Cl.
*H01J 37/32*    (2006.01)

(52) U.S. Cl.
CPC .. *H01J 37/32165* (2013.01); *H01J 37/32183* (2013.01); *H01J 37/32935* (2013.01)

(58) Field of Classification Search
CPC .......... H01J 37/32165; H01J 37/32183; H01J 37/32935; G01R 33/0047; G01R 33/02
USPC ........................................ 204/192.13, 298.03
See application file for complete search history.

(56) References Cited

U.S. PATENT DOCUMENTS

| | | | |
|---|---|---|---|
| 6,333,634 | B1 | 12/2001 | Haze et al. |
| 2002/0153886 | A1 | 10/2002 | Kawakami |
| 2011/0187373 | A1 | 8/2011 | Wisler et al. |
| 2017/0354453 | A1* | 12/2017 | Krasik .................. A61B 1/018 |
| 2019/0131116 | A1 | 5/2019 | Xie |
| 2019/0385822 | A1 | 12/2019 | Marakhtanov et al. |

FOREIGN PATENT DOCUMENTS

JP    10-090381    *    4/1998

OTHER PUBLICATIONS

Machine Translation JP 10-090381 (Year: 1998).*
ISR & Written Opinion PCT/US2021/023246, dated Jul. 12, 2021, 10 pages.

* cited by examiner

*Primary Examiner* — Rodney G Mcdonald
(74) *Attorney, Agent, or Firm* — PENILLA IP, APC

(57) ABSTRACT

A magnetic field sensor for measuring magnetic field of a current applied to a lower electrode defined within a plasma chamber includes a conductor element disposed along a length of a tubular housing. A plurality of slots is defined on one side of the tubular housing to expose the conductor element.

14 Claims, 10 Drawing Sheets

RF MAGNETIC FIELD SENSOR FOR HARMONIC MEASUREMENTS AND UNIFORMITY CONTROL

CLAIM OF PRIORITY

This application is a national stage filing of and claims priority, under 35 U.S.C. § 371, to PCT/US21/23246, filed on Mar. 19, 2021, and titled "RF MAGNETIC FIELD SENSOR FOR HARMONIC MEASUREMENTS AND UNIFORMITY CONTROL", which claims the benefit of and priority, under 35 U.S.C. § 119(e), to Provisional Patent Application No. 63/003,180, filed on Mar. 31, 2020, and titled "RF MAGNETIC FIELD SENSOR FOR HARMONIC MEASUREMENTS AND UNIFORMITY CONTROL", both of which are incorporated by reference herein in their entirety.

FIELD

The present disclosure relates to systems and methods for detecting strength of power delivered to an electrode of a plasma chamber, and more specifically, using the detected strength to fine tune the RF signal for controlling a profile of plasma sheath formed over a wafer within the plasma chamber.

BACKGROUND

A wafer processing tool includes one or more radiofrequency generators (RFG), and impedance matching network, and a plasma chamber. The RFGs generate power of different frequencies that are provided to the plasma chamber via the impedance matching network. A process gas is supplied to the plasma chamber for processing a wafer placed within the plasma chamber. Power provided via the RFGs is used to energize the process gas and generate plasma within a processing region defined in the plasma chamber. Sometimes the power provided to the plasma chamber, may cause reflective power to be generated at the plasma chamber that is reflected back to the RFGs.

The plasma generated in the plasma chamber has to be controlled in order to ensure that a desired profile of the plasma sheath is formed over a surface of the wafer in order to optimize plasma processing results on the surface of the wafer. In order to control the distribution of the plasma sheath, attributes of different operational parameters associated with the plasma chamber that influence the distribution of the plasma sheath need to be identified, (e.g., type of process gases used, distribution (i.e., flow rate) of gases, frequency of RF power applied to the plasma chamber, etc.) and fine-tuned.

It is in this context that embodiments described in the present disclosure arise.

SUMMARY

The various implementations describe ways for detecting attributes of different operational parameters used in operating the plasma chamber and identifying specific ones of the operational parameters for fine tuning its attributes in order to influence the profile of the plasma sheath formed over a surface of a wafer received in the plasma chamber. Operational parameters, such as type of process gas(es) used in the plasma chamber, flow rate of process gas, temperature in the plasma chamber, frequency of RF signal provided to generate plasma, etc., have been shown to influence the formation of the plasma sheath. General adjusting of attributes of certain ones of these operational parameters have resulted in marginally influencing the plasma sheath profile. In order to be able to better control profile of the plasma sheath, specific attributes of the RF signal delivered to the plasma chamber have to be precisely captured so that they can be fine-tuned to influence the plasma sheath profile over the wafer (also referred to herein as a substrate).

In one example embodiment, a magnetic field sensor is disclosed. The magnetic field sensor is disposed proximal to a power rod that provides radio frequency (RF) power to a plasma chamber. The magnetic field sensor may be located within a housing unit that is part of an impedance matching network of the RF power system. The impedance matching network is disposed between one or more radio frequency generators (RFGs) and an electrode of the plasma chamber. RF current from the impedance matching network is conveyed to the electrode via a conductive rod (also referred to herein as "power rod" or "RF rod"). The RFGs may generate low frequency signals and/or high frequency signals. The magnetic field sensor is disposed proximate to the first end of the power rod to detect magnetic field generated by the power supplied to the power rod. The magnetic field sensor, due to its proximity to the power rod, is also equipped to detect power reflected back from the plasma chamber.

In one implementation, the magnetic field sensor includes a tubular housing that is connected to ground. A conductor element is disposed inside and along a length of the tubular housing, and is electrically isolated from the tubular housing. The tubular housing includes a plurality of slots that exposes the conductor element.

The plurality of slots of the magnetic field sensor is used to sense B-field (i.e., the magnetic field) resulting from the radio frequency (RF) current at the power rod. The RF current at the power rod includes the RF current (i.e., forward current) supplied to the electrode by the one or more RFGs and a return current (i.e., reflective current) that is reflected back from the electrode. The plurality of slots defined in the tubular housing of the magnetic field sensor allows the conductor element to detect the magnetic fields generated by both the forward current and the reflective current.

In another implementation, a sensor subsystem is disclosed. The sensor subsystem is disposed between an output of a matching network and an input of a power rod used for supplying radio frequency (RF) power to a plasma chamber. The sensor subsystem includes a magnetic field sensor having a tubular housing with a plurality of slots and a conductor element disposed inside and along a length of the tubular housing. The tubular housing of the magnetic field sensor is oriented parallel to and spaced apart from a connection strap that electrically connects the output of the matching network to the power rod. The tubular housing is connected to a ground potential and the conductor element is used to sense a magnetic field produced with the RF power supplied to the plasma chamber.

In yet another implementation, a method for controlling uniformity of an etch process in a plasma chamber, is disclosed. The method includes sensing a magnetic field generated by a radio frequency current provided to the plasma chamber. Features of the magnetic field are analyzed. Based on the analyzed features, at least one attribute of the RF current is adjusted to tune the plasma sheath to have a pre-defined profile over a substrate, for improving uniformity of the etch process performed in the plasma chamber.

The magnetic field detected by the magnetic field sensor is used to determine the attributes of the RF current at the power rod and a resulting plasma sheath profile generated over a surface of the wafer received in the plasma chamber. Based on the type of profile of the plasma sheath desired over the surface of the wafer, specific portions (i.e., time-related portions) of the RF signal associated with the RF current may be identified and the attribute of the RF current fine-tuned. In some implementations, the specific portions of the RF signal that influence the plasma sheath profile may correspond with a downward slope (i.e., time intervals that correspond with negative crossover of the frequency) of the RF signal. In some implementations, the RF signal may be a continuous wave RF signal and the fine-tuning is done on the continuous wave RF signals. In other implementations, the RF signal may be a pulsed RF signal and the fine-tuning is done on the pulsed RF signals. The RF signals are generated by the one or more RFGs, wherein the one or more RFGs may include low frequency generators and high frequency generators. Thus, instead of adjusting the entire frequency of the RF signal, which may result in marginal changes to the plasma sheath profile, specific portions of the RF signal can be identified and fine-tuned to better control the plasma sheath profile.

After fine-tuning the frequency of the RF current, the profile of the plasma sheath is verified. When the fine-tuning results in the plasma sheath of desired profile, the fine-tuned frequency is determined to be the optimal frequency of the RF signal that is to be applied to the plasma chamber. If, however, the profile of the plasma sheath needs to be further adjusted, then the process of identifying specific portions of the RF signal to fine-tune, and fine-tuning the frequency of the RF signal at the identified time interval(s) is continued till the desired profile of the plasma sheath is generated.

The magnetic field sensor is used in identifying the attributes of the RF signal delivered to the power rod via measurement of the B-field resulting from the RF signal. Time variant attributes of the RF signal are identified and specific time variant of the RF signal is fine-tuned so as to influence the plasma sheath profile. The adjustment to the plasma sheath profile may be influenced by the type of processing that is desired on the surface of the wafer. In some cases, the plasma sheath may need to be more pronounced over the edge of the wafer. In other cases, the plasma sheath may need to be evenly distributed over the entirety of the wafer. Thus, depending on where the bulk of the plasma needs to be positioned, specific ones of the time variants of the RF signal are identified by analyzing the magnetic field sensed by the magnetic field sensor and the RF signal is fine-tuned in those time variants so as to cause the desired plasma sheath profile over the wafer in order to obtain optimal processing results. In some implementations, the fine-tuning may be performed to control uniformity of an etch process in the plasma chamber.

Advantages of the systems and methods described herein include detecting intensity (i.e., a feature) of the magnetic field generated from the RF current at the power rod, for different time variants, and controlling the plasma sheath profile formed over a surface of a wafer by adjusting the frequency of the RF power delivered to the electrode at specific time variants. In some cases, the plasma sheath profile may be better controlled by fine-tuning the RF signal at time intervals that correspond with the downward slope (i.e., time intervals that are close to negative crossover). In other cases, the plasma sheath profile may be better controlled by fine-tuning the RF signal at time intervals that correspond with the upward slope (i.e., time intervals that are close to positive crossover). The delivery of RF power may be controlled by decreasing the RF power delivery or by increasing the RF power delivery to the electrode at the specific time intervals.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe systems and methods for optimizing power delivery to an electrode of a plasma chamber. It will be apparent that the present embodiments may be practiced without some or all of these specific details. In other instances, well known operations have not been described in detail in order not to unnecessarily obscure the present embodiments.

Figure 1:
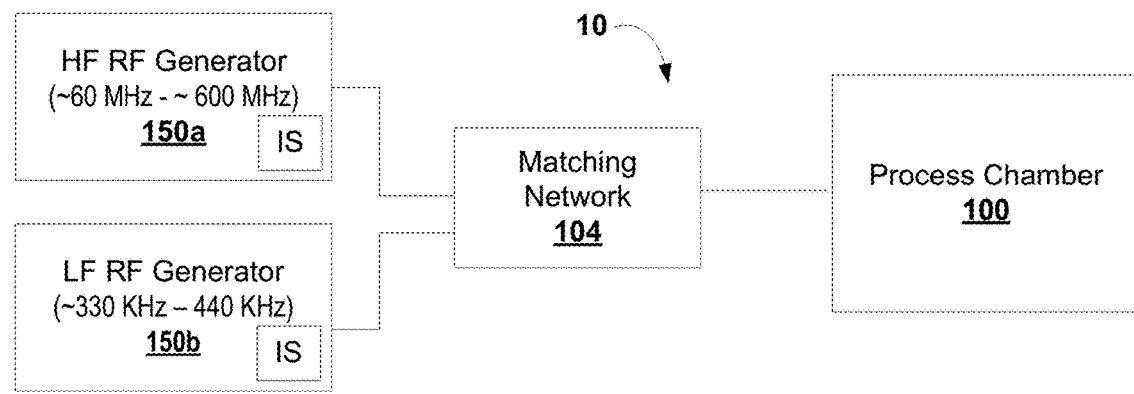
FIG. 1 is a block diagram of an embodiment of a plasma chamber used to optimize power delivered to an electrode in the plasma chamber.

FIG. 1 is a simplified block diagram of an embodiment of a wafer processing system 10 that is used to control power delivered to an electrode of the wafer processing system, in one implementation. The wafer processing system 10 may include a process chamber in which the wafer is received for processing. The process chamber may be a capacitively coupled plasma (CCP) chamber. As a result, the process chamber may interchangeably be referred to herein as a plasma chamber 100. During processing, the wafer is exposed to plasma in order to define features on the surface of the wafer. The features may be defined by plasma etching or by way of deposition of material. The plasma chamber 100 includes an upper electrode (not shown) and a lower electrode (not shown). The upper electrode of the plasma chamber 100 is connected to one or more gas sources (not shown) that supply process gas to a processing region defined between the upper and the lower electrodes. The lower electrode includes a wafer receiving surface on which the wafer is received for processing. The lower electrode is connected to one or more power generators (e.g., radio frequency generators (RFGs)) via a matching network 104, and is therefore a powered electrode. In this implementation, upper electrode is grounded. In alternate implementations, the upper electrode may be powered and the lower electrode may be grounded. The RFGs provide the power of different frequency to excite the process gas and generate plasma. For example, the HF RFGs 150a, LF RFGs 150b, may be configured to provide high frequency power (e.g., about 60 MHz to about 600 MHz) and/or low frequency power (e.g., between about 330 kHz and 440 kHz). A computer (not shown) may be communicatively connected to the plasma chamber 100, the matching network 104 and the RFGs 150a, 150b to control the various aspects of the plasma generation in the processing region of the plasma chamber 100. The power provided to the lower electrode is sufficient to generate plasma in the plasma processing region for processing the wafer.

Figure 2B:
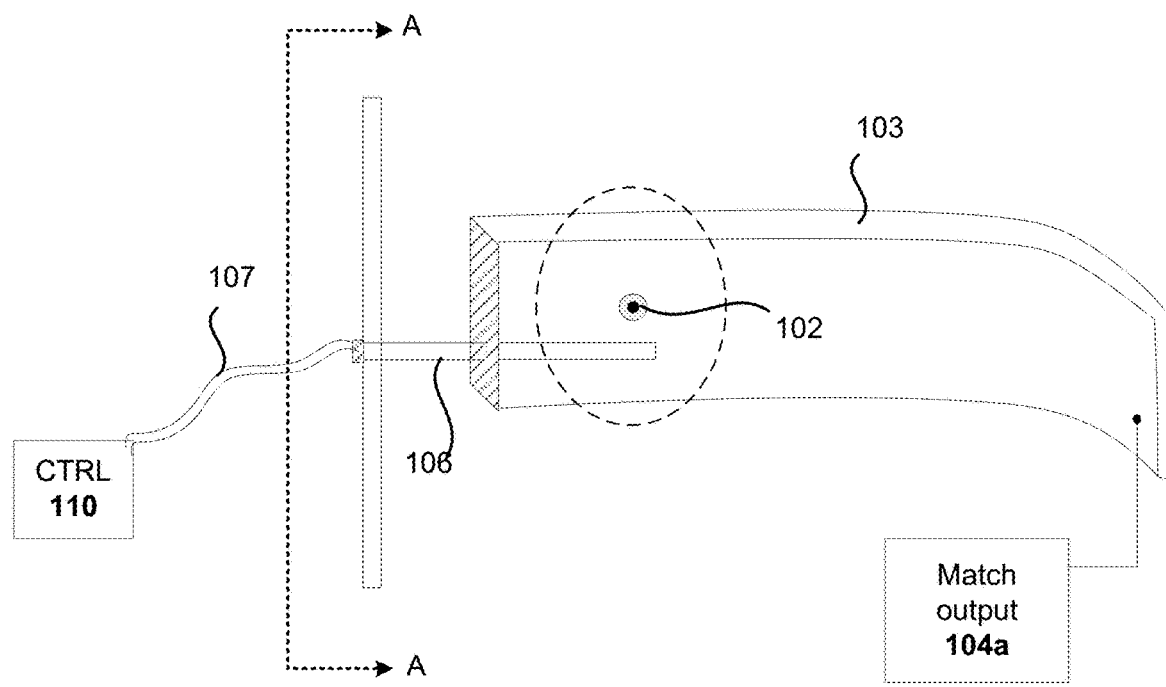
FIG. 2B is an expanded side perspective view of a portion of a connection strap that connects the power rod to an impedance matching network, in accordance to one embodiment of the invention.
Figure 2A:
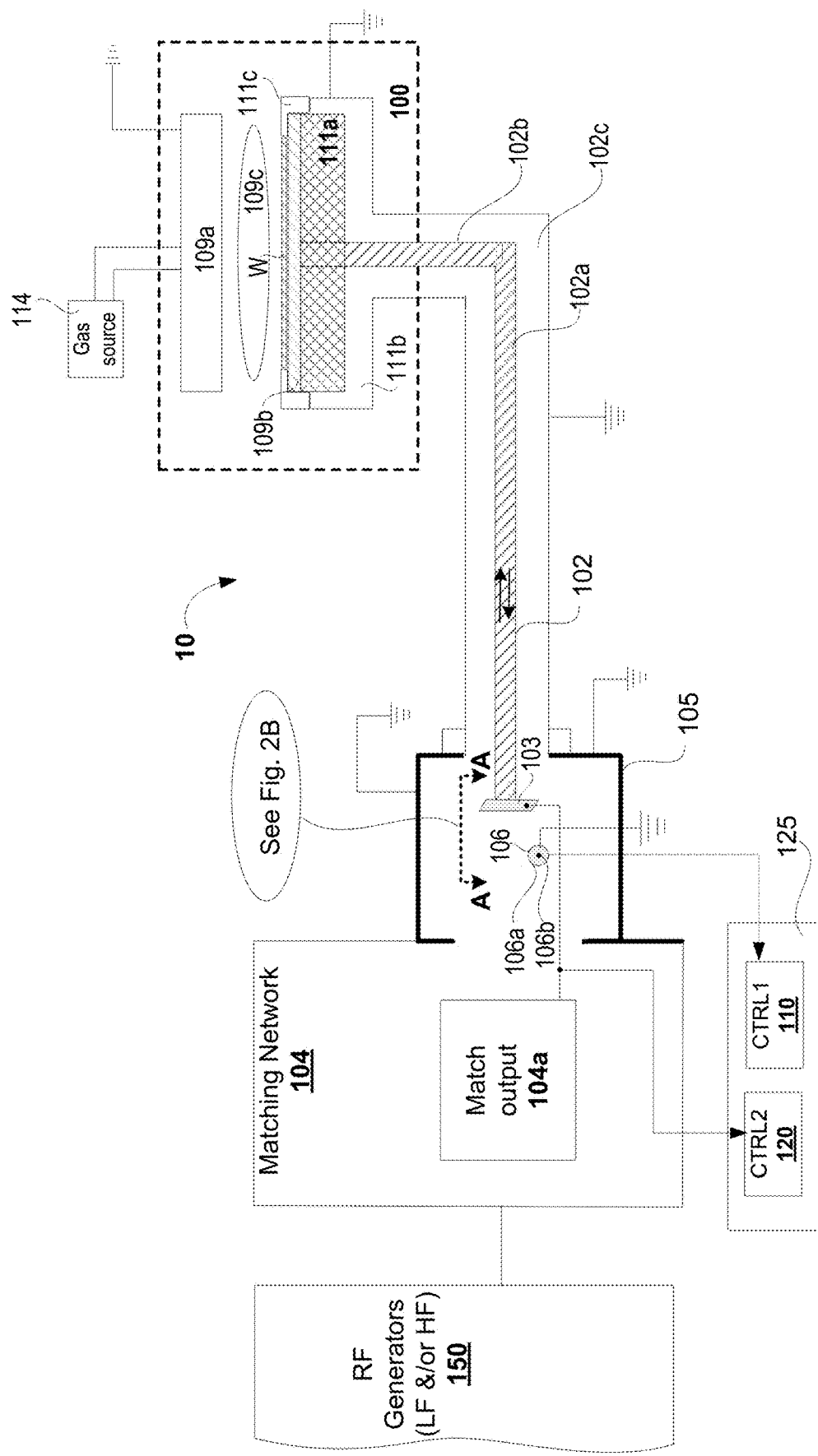
FIG. 2A is an expanded view of a impedance matching network of a radio frequency power in which a magnetic field sensor is disposed, in accordance to one embodiment of the invention.

FIG. 2A illustrates a detailed diagram of a wafer processing system 10. The wafer processing system 10 includes a plasma chamber 100, a matching network 104, a set of radio frequency generators (RFGs) 150 and a computer 125. The plasma chamber 100 includes an upper electrode 109a disposed in a top portion of the plasma chamber 100 and a lower electrode 109b that is disposed in a bottom portion of the plasma chamber 100, such that the lower electrode 109b is oriented opposite to the upper electrode 109a to define a processing region 109c there-between. In one implementation, the upper electrode 109a is connected to a process gas source 114 and includes a plurality of outlets for supplying process gas from the process gas source 114 to the processing region 109c. The upper electrode 109a may be grounded and the lower electrode 109b may be powered by the set of RFGs 150. The lower electrode 109b includes a base plate or a facility plate 111a in which facilities of the lower electrode 109b are housed, and a support surface disposed over the base plate 111a to support a wafer received for processing. The set of RFGs 150 is coupled to the matching network 104, which supplies power to the lower electrode 109b via a power rod 102 (i.e., RF rod) that is coupled to the bottom of the lower electrode 109b via the base plate 111a. The lower electrode 109b and the base plate 111a are connected to a grounded member 111b. In some implementations, a ring, such as a confinement ring 111c, may be disposed over the grounded member 111b, so that a top surface of the confinement ring 111c is adjacent to the wafer W and is co-planar with a top surface of the wafer W, when the wafer W is received on the lower electrode 109b.

Computer 125 may include a desktop computer, a laptop computer, a smart phone, a controller, or a server. The computer 125 includes a processor (not shown) and a memory device (not shown). As used herein, a processor is a controller, or an application specific integrated circuit (ASIC), or a programmable logic device (PLD), or a central processing unit (CPU), or a microcontroller, or a microprocessor, and these terms are used interchangeably herein. Examples of a memory device may include a random access memory (RAM), a read-only memory (ROM), and a combination thereof. The processor is coupled to the memory device.

The RFGs 150 may include one or more low frequency (LF) radio frequency generators (RFGs) (150b of FIG. 1), or high frequency (HF) RFGs (150a of FIG. 1), or a combination of both LF RFGs 150b and HF RFGs 150a. The LF RFG 150b can be a radiofrequency generator that operates in a kilohertz (kHz) frequency range. For example, the LF RFG 150b may operate at a frequency ranging between about 300 kHz and about 500 kHz. In some specific examples, the LF RFG 150b may operate between 330 kHz and 440 kHz. The HF RFG 150a can be a radiofrequency generator that operates in a megahertz (MHz) frequency range. As an example, the HF RFG 150a may operate at a frequency ranging between about 50 MHz and about 700 MHz or at a frequency ranging between about 60 MHz and about 600 MHz.

The HF RFG 150a may include a HF frequency controller (not shown), a HF driver (not shown), and an HF RF power supply (not shown), wherein the HF frequency controller is coupled to the HF driver and the HF driver is coupled to the HF RF power supply to control frequency of the power supplied by the HF RFG 150a. An output of the HF RFG 150a is connected to match output 104a of the matching network 104. Similarly, the LF RFG 150b may include a LF frequency controller (not shown), a LF driver (not shown), and an LF RF power supply (not shown), wherein the LF frequency controller is coupled to the LF driver, and the LF driver is coupled to the LF RF power supply to control the frequency of the power supplied by the LF RFG 150b. An output of the LF RFG 150b is connected to match output 104a of the matching network 104. An example of a driver (either LF or HF) may include one or more transistors and an example of an LF or HF RF power supply may include an LF/HF RF oscillator that oscillates at an LF/HF RF frequency. The matching network 104 is interchangeably referred to herein as an impedance matching circuit or an impedance matching network. The plasma chamber 100 may be a capacitively coupled plasma (CCP) chamber and the lower electrode may be powered.

A sensor subsystem is disposed between an output of the matching network 104 and the power rod 102. The sensor subsystem includes a sensor housing 105 with a magnetic field sensor 106 and a power rod 102 that extends between the sensor housing 105 and an electrode of the plasma chamber 100. For example, the power rod 102 extends from the sensor housing 105 and is coupled to the lower electrode 109b through the base plate 111a. The power rod 102 may include a horizontal portion 102a and a vertical portion 102b. A first end of the horizontal portion 102a is connected to the match output 104a of the impedance matching network 104 via a connection strap 103, and a second end of the horizontal portion 102a of the power rod 102 extends for a distance so as to align with and connect to a first end of the vertical portion 102b. The second end of the vertical portion 102*b* is connected to a bottom surface of the base plate 111*a*. Since the vertical portion 102*b* connects the power rod 102 to the lower electrode 109*b*, the vertical portion 102*b* is also called the power rod connector. The power rod 102 is housed within a rod housing 102*c*, which is electrically grounded. The power rod 102 is used to conduct the RF current from the match output 104*a* to the lower electrode 109*b* through the base plate 111*a* and the reflective current that is reflected back from the lower electrode 109*b*. An output of the match output 104*a* is also connected to a controller, CTRL 2 120, so as to communicate attributes of the RF current (i.e., attributes of forward flowing RF current and reverse RF current) conducted through the power rod 102. Some of the attributes of the RF current that may be communicated may include frequency, amplitude, etc.

The sensor housing 105 extends outward from the matching network 104. The sensor housing 105 is configured to receive a magnetic field sensor 106 through an opening defined on a first sidewall. In one implementation, the magnetic field sensor 106 is disposed proximate to and oriented parallel to the power rod 102 received through a corresponding opening defined on a second sidewall of the sensor housing 105. The magnetic field sensor 106 is spaced apart from the power rod. A separation distance between the magnetic field sensor 106 and the power rod 102 is defined to allow the magnetic field sensor to detect the magnetic field generated by the flow of the RF current through the power rod 102. In one embodiment, the first sidewall is perpendicular to the second sidewall of the sensor housing 105. In another implementation, the orientation of the first sidewall to the second sidewall may depend on the shape of the sensor housing 105. In yet another implementation (not shown), the magnetic field sensor 106 may be disposed proximate to and along the length of the power rod 102 (i.e., parallel to the power rod) and is spaced apart from the power rod 102 by a separation distance. In one implementation, the magnetic field sensor 106 may be disposed on the same sidewall or on a sidewall that is parallel to the sidewall that is coupled to the power rod 102. The magnetic field sensor 106 includes a tubular housing 106*a* that is electrically grounded. A conductor element 106*b* is disposed inside the tubular housing 106*a* and extends along a length of the tubular housing 106*a*. A plurality of slots 106*c* (shown in FIG. 3B) is defined on one side of the tubular housing 106*a*. The magnetic field sensor 106 received in the sensor housing 105 is oriented, such that the side of the tubular housing 106*a* with the plurality of slots 106*c* defined thereon faces the power rod 102. The conductor element 106*b* exposed by the opening of the slots 106*c* allow the conductor element 106*b* to detect the B-field generated by the RF current at the power rod 102. The magnetic field sensor 106 is coupled to a first controller, CTRL1 110, to provide features of the B-field (i.e., magnetic field) detected from the RF current at the power rod 102. The power rod 102 is connected to a second controller, CTRL2, 120 through a connection strap 103 (shown in FIG. 3B). In one embodiment, the first controller 110 may be distinct from the second controller 120. In an alternate embodiment, the first controller 110 is integrated with the second controller 120. The first controller 110 and the second controller 120 may be part of the computer 125. Computer 125 receives the attributes of the RF current conveyed through the power rod 102 and the features of the magnetic field detected by the magnetic field sensor 106, determine a profile of the plasma sheath formed in the processing region 109*c* and determine if the profile of the plasma sheath needs to be fine-tuned. If the profile of the plasma sheath needs to be fine-tuned, the computer 125 analyzes the attributes of the RF current and the features of the magnetic field to identify specific attributes of the RF current and a specific range of time intervals of the RF signal associated with the RF current, to tweak in order to influence the profile of the plasma sheath defined over the surface of the wafer W. In one implementation, the adjustment to the profile of the plasma sheath may be carried out in an iterative manner.

FIG. 2B illustrates an expanded view of section A-A identified in FIG. 2A, which shows the power rod connectivity to the match output 104*a* within the sensor housing 105, in one implementation. A connection strap 103 is used to connect the power rod 102 to the match output 104*a*. The connection strap 103, in some implementations, is disposed such that a portion of the connection strap 103 is linearly oriented in relation to the magnetic field sensor 106. For example, the portion of the connection strap 103 runs substantially parallel to the magnetic field sensor 106 for at least a length of the tubular housing 106*a* of the magnetic field sensor 106 and then is contoured toward the match output 104*a* of the matching network 104 within the sensor housing 105. The location and orientation of the connection strap 103 within the sensor housing 105 ensures that the power rod 102 is electrically isolated from the magnetic field sensor 106. The output from the matching network 104 is connected to controller 2 120 to provide details of the forward RF current supplied to the electrode (e.g., lower electrode 109*b*) of the plasma chamber 100 and the reflective current from the electrode. The magnetic field sensor 106, meanwhile, extends from an opening defined on a first sidewall of the sensor housing 105. The magnetic field sensor 106, in this implementation, is disposed so that a portion of the connection strap 103 is parallel to the tubular housing 106*a* of the magnetic field sensor 106. In some implementations, the magnetic field sensor 106 may be orthogonal to the power rod 102 that is received through an opening defined on a second sidewall of the sensor housing 105 and be separated from the power rod by a distance. The first sidewall, in this implementation, is perpendicular to the second sidewall of the sensor housing 105. The magnetic field sensor 106 is connected to controller 110 through a coaxial cable 107 to provide details of the magnetic field sensed at the power rod 102.

Figure 3A:
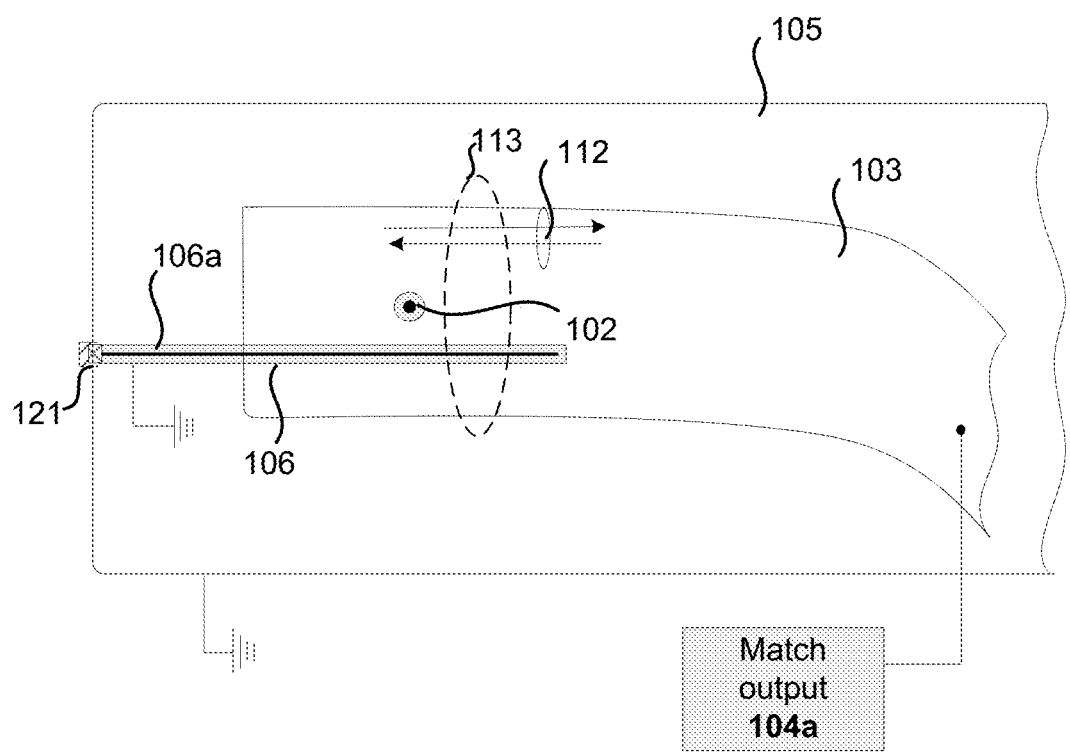
FIG. 3A illustrates an expanded view of a portion of housing within the impedance matching network in which the magnetic field sensor is disposed in relation to the power rod and the connection strap that connects the power rod to the impedance matching network, in accordance with on implementation.

FIG. 3A illustrates an expanded side view of a portion of a sidewall of the sensor housing 105 that is configured to receive the magnetic field sensor 106, in one implementation. The magnetic field sensor 106 is received into the sensor housing 105 via an opening 121 defined on the sidewall of the sensor housing 105, so that the magnetic field sensor 106 is parallel to a portion of the connection strap 103 and is orthogonal to the power rod 102 with a separation distance defined between the magnetic field sensor 106 and the power rod 102. The sensor housing 105 is connected to ground. In some implementations, the magnetic field sensor 106 is received within the sensor housing 105 so that it is positioned below the power rod 102. In such implementations, the magnetic field sensor 106 is oriented so that the openings of the slots 106*c* are at least partially facing the connection strap 103 (i.e., upward) to expose the conductor element 106*b* to the power rod 102. The implementations are not restricted to this orientation but can include other orientations, such as being positioned above or on a side of the power rod 102. In the implementation where the magnetic field sensor 106 is positioned above the power rod 102, the magnetic field sensor 106 is oriented so that the openings of the slots 106*c* face downward so as to expose the conductor element 106*b* to the power rod 102. It should be noted that in alternate implementations, the magnetic field sensor 106 may be positioned anywhere along a length of the power rod 102 so that it is disposed parallel to the power rod 102 and is separated by a separation distance that allows the magnetic field sensor 106 to detect the magnetic field generated by the RF current. The RF current flows in the direction 112 of the power rod 102 that is parallel to the magnetic field sensor 106. Based on the right-hand rule, the B-field (i.e., magnetic field) for the RF current is in a direction 113 that is perpendicular to the direction 112 in which the RF current flows. When the RF current is flowing in a forward direction (i.e., current conveyed to the plasma chamber 100), the magnetic field is moving in an anti-clockwise direction and when the RF current is reflecting back from the plasma chamber 100 (i.e., reverse flow of RF current), the magnetic field is moving in a clockwise direction. The magnetic field sensor 106 is able to detect the magnetic field for the forward current and the reflective current and convey the features of the detected magnetic field to the first controller 110. The match output 104a conveys the attributes of the RF current to the second controller 120. The attributes of the RF current and the features of the magnetic field are analyzed to determine a plasma sheath profile of the plasma generated in the processing region 109c of the plasma chamber 100 and to determine which portion of an RF signal has to be fine-tuned to adjust the profile of the plasma sheath.

Figure 3B:
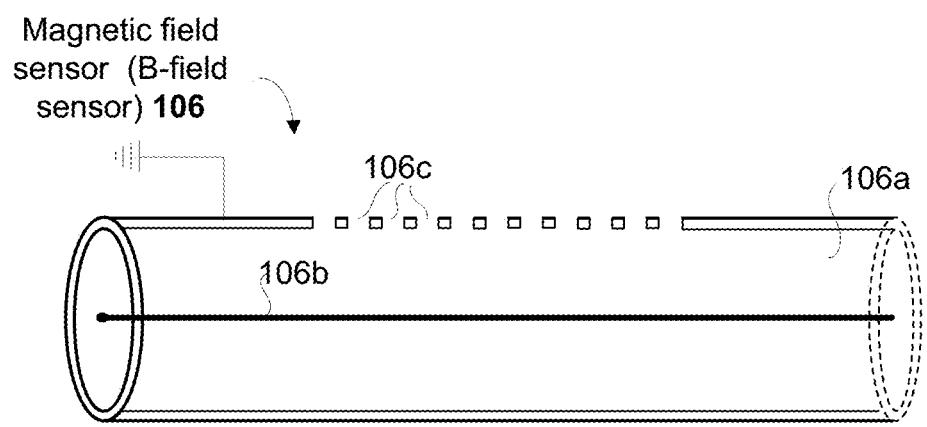
FIG. 3B illustrates an expanded view of the magnetic field sensor that is used for sensing B-field (i.e., magnetic field) generated at the power rod, from RF current supplied to the electrode of the plasma chamber, in accordance with one implementation.

FIG. 3B illustrates an expanded view of the magnetic field sensor 106 used in detecting the B-field of the RF current supplied to the lower electrode 109b of the plasma chamber 100, in one implementation. It should be noted that the magnetic field detected by the magnetic field sensor 106 is interchangeably referred to herein as B-field. As previously mentioned, the magnetic field sensor 106 includes a tubular housing 106a that extends for a length. A conductor element 106b is disposed inside the tubular housing 106a and extends the length of the tubular housing 106a. A plurality of slots 106c is defined on one side of the tubular housing 106a and is designed to expose the conductor element 106b. The magnetic field sensor 106 is positioned inside the sensor housing 105 so that the openings of the slots 106c face the power rod 102. This allows the conductor element 106b of the magnetic field sensor 106 to detect the magnetic field generated from the RF current. Portions of the tubular housing 106a between any consecutive pair of slots 106c act as a shield. Depending on the location of the magnetic field sensor 106 in relation to the power rod 102 (e.g., above or below or on a side) within the sensor housing 105, the slots 106c are oriented to face the power rod 102.

Figure 3C:
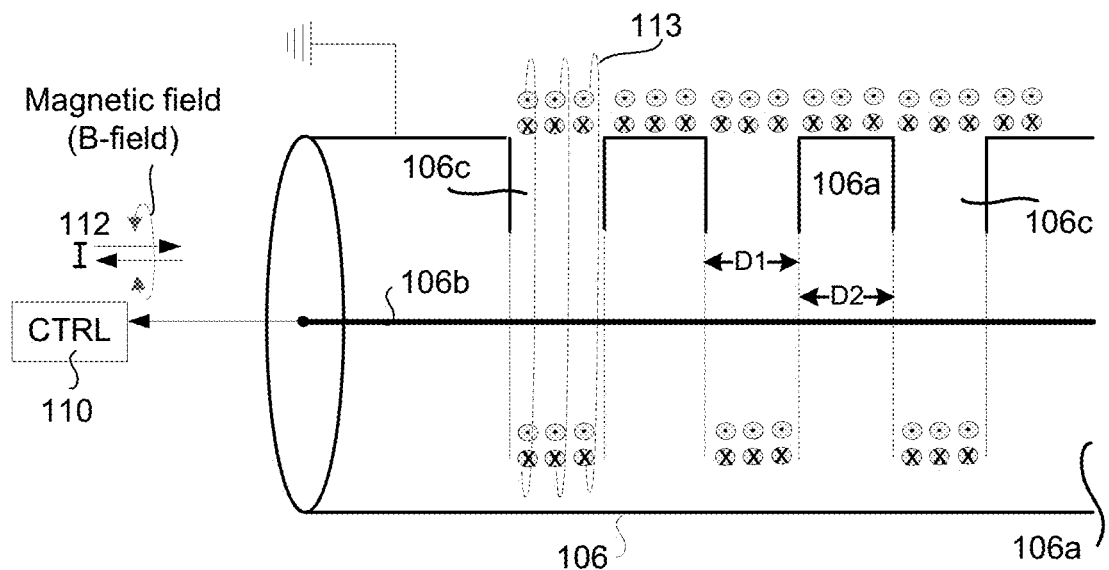
FIG. 3C illustrates an expanded view of a portion of the magnetic field sensor for detecting the B-field (i.e., magnetic field), in accordance with one implementation.

FIG. 3C illustrates an expanded view of the magnetic field sensor 106 to show the direction 112 of flow of the RF current in relation to the direction 113 of the flow of the magnetic field generated by the RF current. The RF current flows in the direction 112 that is generally parallel to the direction of the magnetic field sensor 106 and the magnetic field flows in a direction 113 that is perpendicular to the direction 112 of flow of the RF current, in accordance to the right-hand rule. The conductor element 106b of the magnetic field sensor 106 detects the magnetic field (i.e., B field) through the slots 106c and features of the detected magnetic field captured by the magnetic field sensor 106 is forwarded to the controller 110 through the coaxial cable 107 (shown in FIG. 2B). The slots 106c defined on one side of the tubular housing 106a of the magnetic field sensor 106 are sized to be of equal width to allow the conductor element 106b to detect the magnetic field. In some implementation, the size 'D1' of each of the slots 106c is defined to be between about 0.5 mm and about 2 mm. Similarly, the portion of the tubular housing 106a between any consecutive pair of slots 106c shield the conductor element 106b and are sized 'D2' to be between about 0.5 mm and about 2 mm. The dimensions of the slots 106c and the shielded portion of the tubular housing 106a are provided as examples and should not be considered restrictive and that other dimensions may also be envisioned. In some implementations, the sizes of the slots 106c are defined to filter out low frequency RF signals and to detect high frequency RF signals. For example, the size of the slots 106c may be defined to filter out the RF signals that are below 20 MHz and to detect RF signals that are above 60 MHz and their harmonics.

Figure 3D:
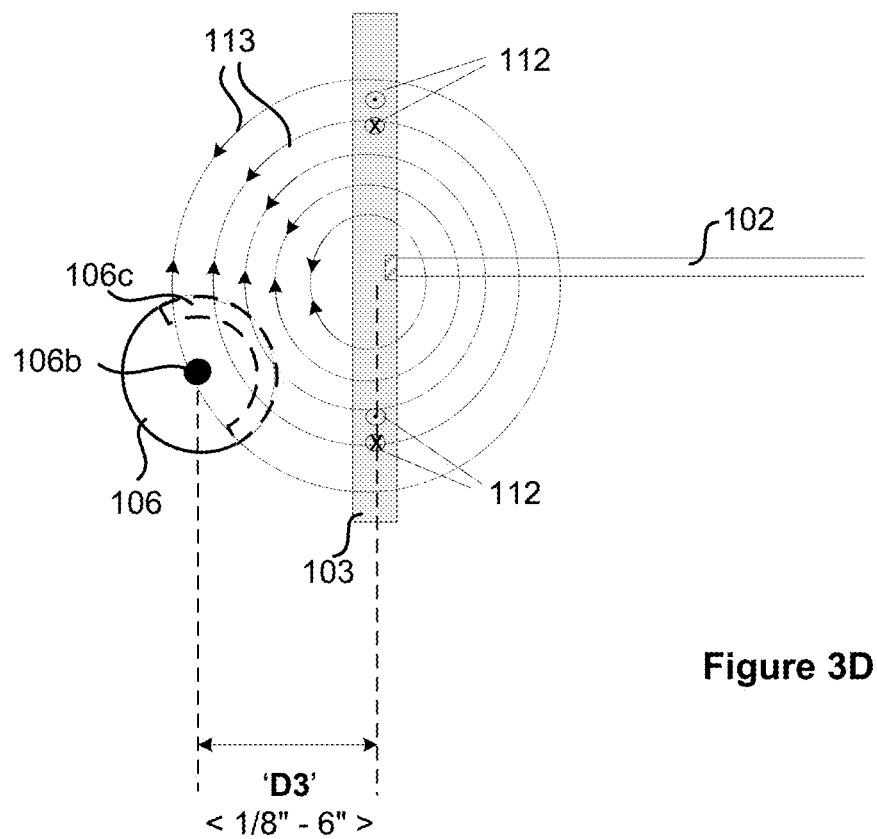
FIG. 3D illustrates the magnetic field around the power rod that is detected through the slots of the magnetic field sensor, in one implementation.

FIG. 3D illustrates the orientation of the slots 106c (shown as broken lines) of the magnetic field sensor 106 in relation to the connection strap 103 and the power rod 102, that enables the magnetic field sensor 106 to detect the magnetic field for the RF current conveyed through the power rod 102, in one implementation. The magnetic field generated by the RF current at the power rod 102 is more intense near the power rod 102 and the intensity reduces as the magnetic field expands concentrically outward. The slots 106c of the magnetic field sensor 106 are directed toward the power rod 102 so that the conductor element 106b can detect the magnetic field (flowing in the anti-clockwise or clockwise direction 113) generated by the RF current flowing (in the forward or reverse direction 112) through the power rod 102. The conductor element 106b of the magnetic field sensor 106 is disposed at a distance 'D3' from the power rod 102. In one implementation, the distance of separation (i.e., separation distance) D3 between the conductor element 106b of the magnetic field sensor 106 and the power rod 102 is between about ⅛" and about 6". The distance of separation is defined to ensure that the magnetic field generated from the RF current at the power rod 102 can be detected by the magnetic field sensor 106.

Figure 4A:
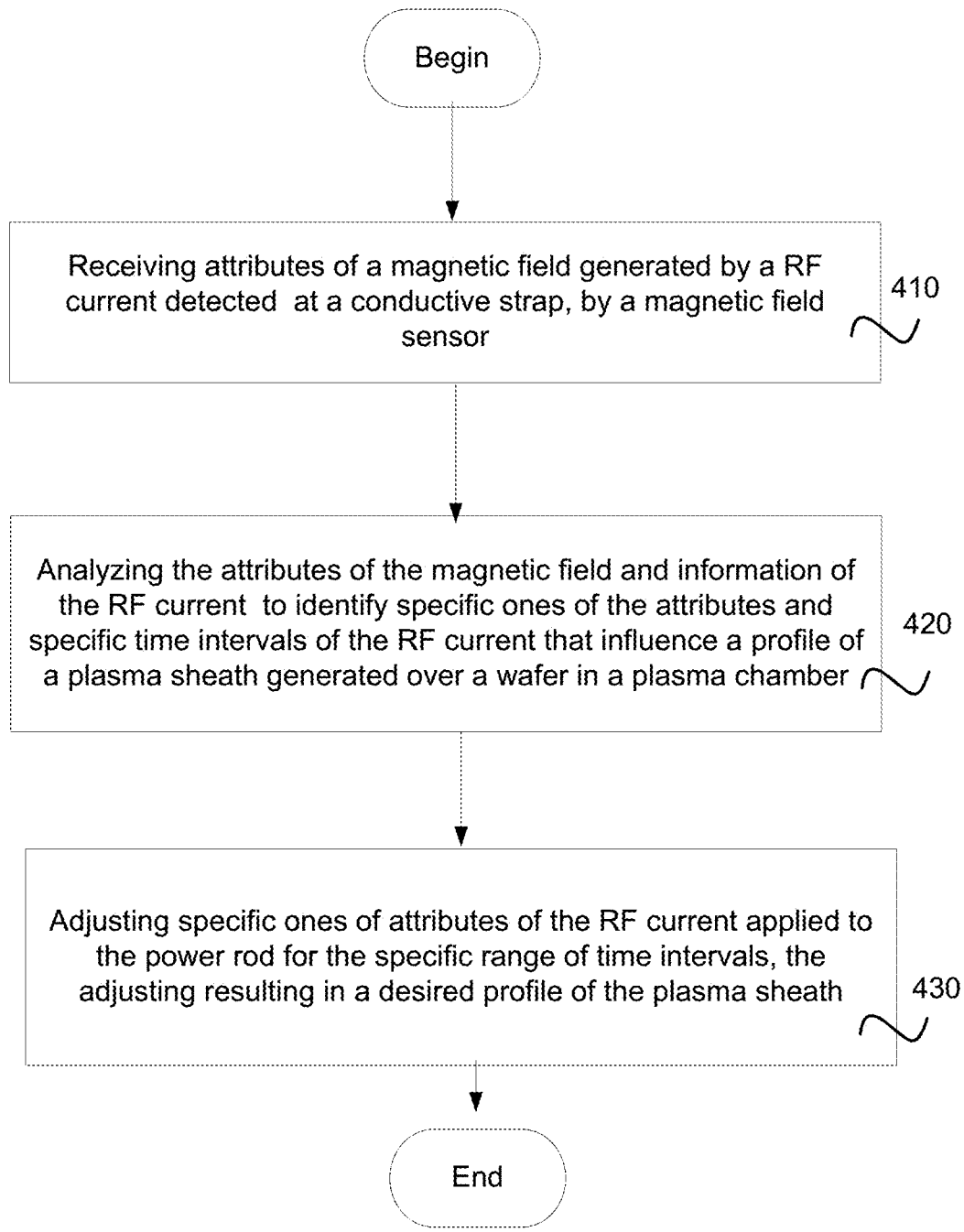
FIG. 4A illustrates a flow chart of operations for identifying specific time intervals of an RF signal that needs to be adjusted to control a profile of the RF plasma sheath, in one implementation.

FIG. 4A illustrates the process of adjusting profile of a plasma sheath in the processing region 109c of a plasma chamber 100, in one implementation. The process begins at operation 410 when the features of a magnetic field generated by a RF current, is obtained by a magnetic field sensor 106. The magnetic field may be detected by a conductor element 106b of the magnetic field sensor 106 exposed to the RF current applied to a power rod 102 that supplies power to an electrode (e.g., lower electrode) of the plasma chamber 100. Features of the magnetic field captured by the magnetic field sensor 106 are forwarded to a first controller, CTRL 1, 110. Information related to the RF current at the match output 104a is forwarded to a second controller, CTRL 2, 120. A computer 125 receives raw data related to attributes of the RF current from CTRL 2, 120 and the features of the magnetic field from CTRL 1, 110, and analyzes the raw data to identify specific ones of the attributes of the RF current and specific range of time intervals of the RF signal associated with the RF current to adjust, in order to influence a profile of the plasma sheath generated over a wafer received in the plasma chamber 100, as illustrated in operation 420. The computer 125 then generates a signal to one or more of the RFGs 150 to adjust the attributes of the RF current applied to the electrode (e.g., lower electrode 109b) of the process chamber for the specific range of time intervals identified from the analysis, as illustrated in operation 430.

In one implementation, after the adjustment, the profile of the plasma sheath formed over the wafer in the plasma chamber 100 is verified. If the plasma sheath has the desired pre-defined profile, then the adjusted attributes of the RF current is determined to be the optimal set of RF current attributes for applying to the plasma chamber 100. If, however, the plasma sheath is not of the desired pre-defined profile, then the attributes of the RF current needs to be further adjusted. In such circumstance, the process of identifying specific attributes of the RF signal and specific range of time intervals to fine-tune, and fine-tuning the frequency of the RF signal at the identified range of time intervals is continued till the desired profile of the plasma sheath is accomplished.

Figure 4B:
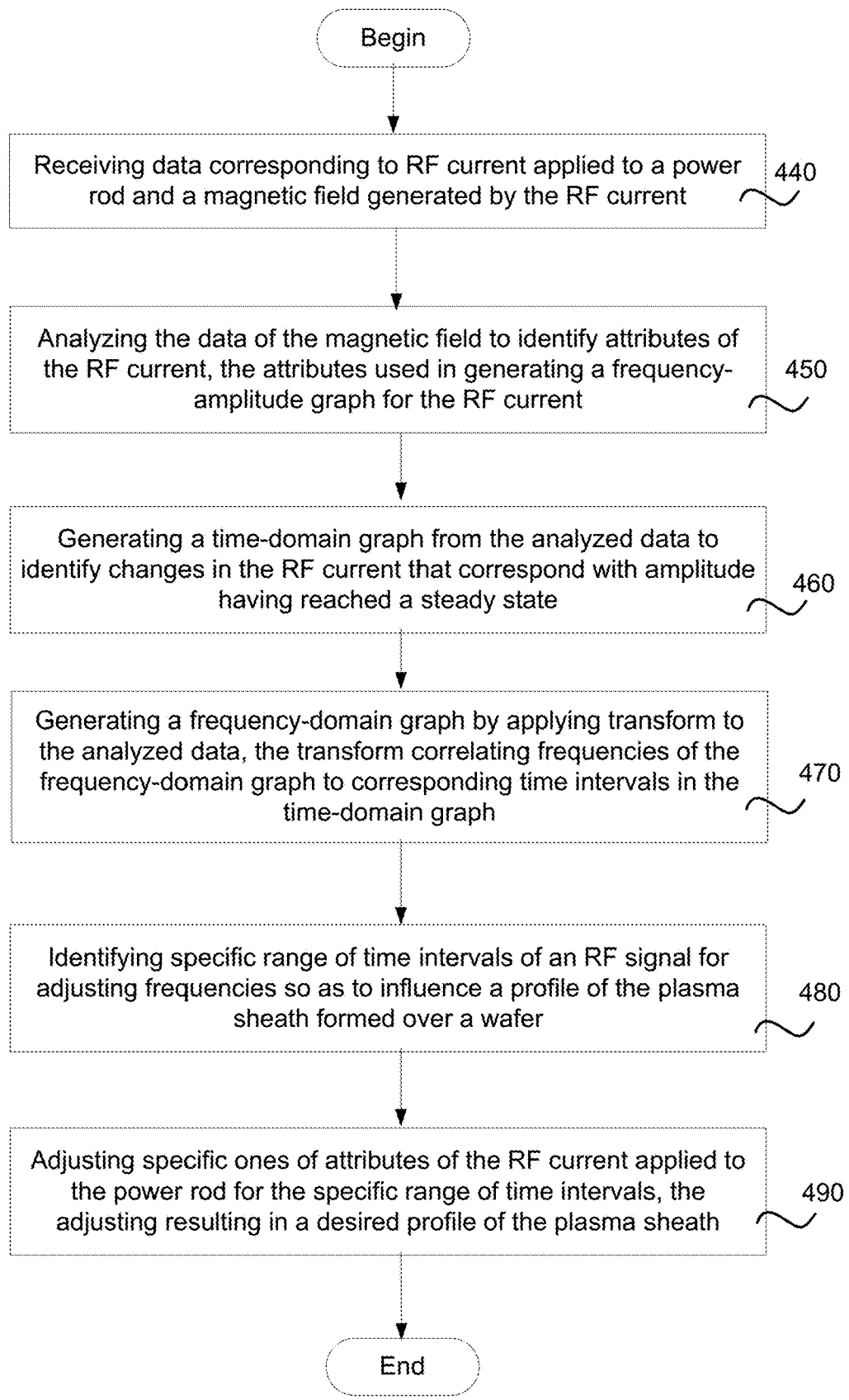
FIG. 4B illustrates process flow operations for analyzing data received from power rod and magnetic field sensor to identify and adjust specific attributes of an RF current at specific time intervals to influence a profile of plasma sheath formed over a wafer, in one implementation.

FIG. 4B illustrates the process flow operations of analyzing the raw data (depicted in operation 420 of FIG. 4A) received from the controllers, CTRL1 110 and CTRL 2 120, to identify and adjust specific attributes of an RF signal at specific range of time intervals, for optimizing power delivered to the plasma chamber 100 in order to obtain a desired plasma sheath profile over a surface of a wafer received in the plasma chamber 100. The plasma chamber 100 is used to process the wafer. FIGS. 5A-5E illustrate the results corresponding to the various operations of FIG. 4B.

Referring simultaneously to FIGS. 4B and FIGS. 5A-5E, the process of fine-tuning the profile of the plasma sheath starts at operation 440 of FIG. 4B, with a processor of the computer 125 accessing raw data provided by the controllers CTRL 1 110 and CTRL 2 120. The raw data corresponds to attributes of the RF current generated in accordance to a recipe retrieved from a memory device. The recipe specifies a frequency and power of an RF signal to be generated by the respective radio frequency generators 150. Based on the recipe, the processor signals the respective controllers (e.g., low/high frequency controllers) to provide the specified frequency/frequencies and power(s). The controllers send a signal to the respective drivers to generate current according to the specified frequency/frequencies and powers. In some implementations, the signal may be sent to multiple drivers, including high frequency drivers and low frequency drivers. The drivers generate the current(s) and provide the current (s) to the appropriate RF power supply/supplies. The RF power supply/supplies generate the appropriate RF signal(s) with the specified frequency/frequencies and power(s) received from the processor. The RF signal(s) is provided as input to the matching network 104. The matching network 104 may be an impedance matching circuit. The matching network 104 matches an impedance of a load coupled to the output with an impedance of the sources coupled to the inputs and combines the HF/LF RF signals to generate a modified RF signal at the output. Thus, the modified RF signal is a combination of one or more of the HF and/or LF RF signals and the corresponding matching impedance. The modified RF signal is supplied to the lower electrode 109b. A current/voltage sensor (not shown) measures a voltage at the output and provides measurements of the voltage having voltage amounts to the controller 120. A magnetic field sensor 106 detects the magnetic field generated by the modified RF current at the power rod 102. Features of the magnetic field detected by the magnetic field sensor 106 are forwarded to the controller CTRL1 110. In one implementation, some of the features of the magnetic field that may be detected by the magnetic field sensor include direction and strength.

The controller CTRL2 120 receives the measurements of the voltage from the current/voltage sensor. The computer 125 receives the voltage measurements from controller 120 and the features of the magnetic field detected by the magnetic field sensor 106 from controller 110, as illustrated in operation 440, and analyzes the voltage measurements and the features of the magnetic field to determine attributes of the modified RF signal, as illustrated in operation 450, generate time and frequency domains of the modified RF signal (operations 460, 470 of FIG. 4B) and use the details from the two domains to determine, (a) the type of plasma sheath profile that is generated in the plasma processing region, and (b) specific range of time intervals associated with a specific RF signal that is a component of the modified RF signal to fine-tune to affect the plasma sheath profile formed over the wafer (operation 480 of FIG. 4B). One or more attributes of the specific RF signal is adjusted in the specific range of time intervals to affect the plasma sheath formed over the wafer W in the plasma chamber 100. The computer 125 may divide a cycle of the specific RF signal tracing the voltage amounts into multiple time intervals of equal magnitude. A power sensor (not shown) may be used to measure power that is delivered at the output for the specific RF signal, for each time interval. The delivered power corresponds to the RF power detected at the power rod 102, which is a difference between forward power and reflective power of the specific RF signal.

Figure 5A:
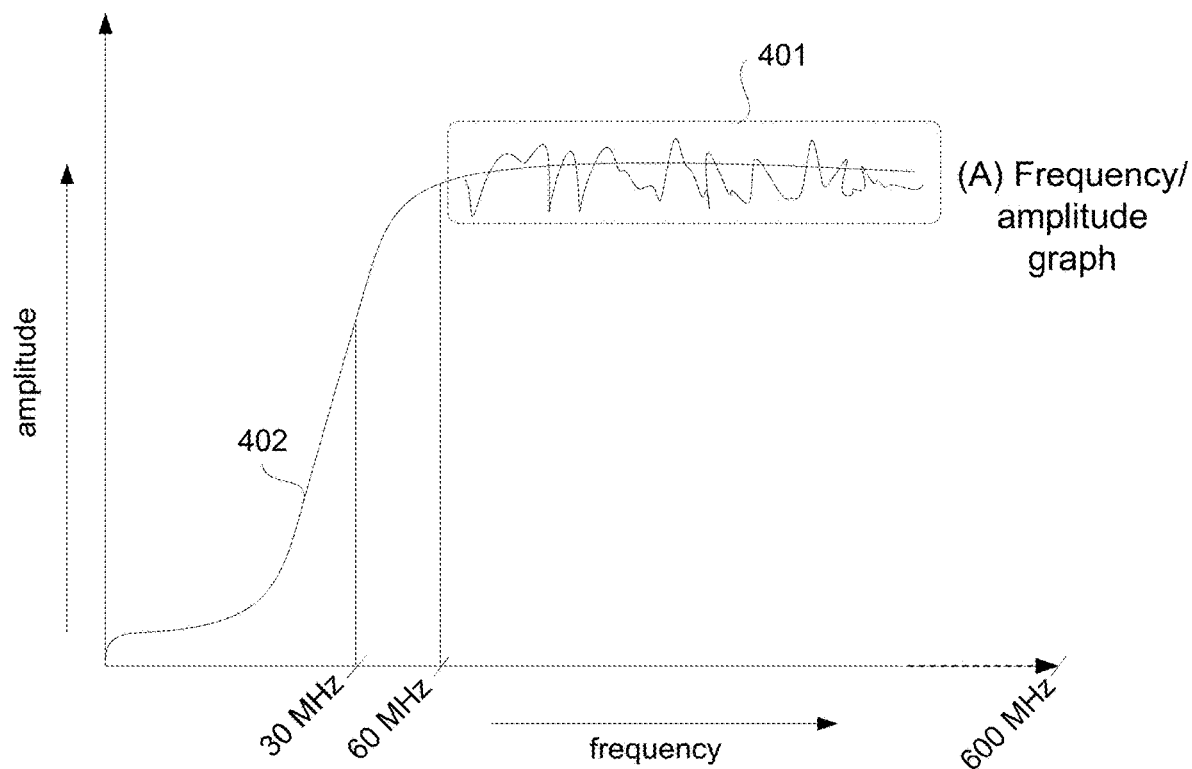
FIGS. 5A-5E illustrate the process of using the features of the magnetic field detected by the magnetic field sensor to determine the time and frequency domains of the RF current and using the time and frequency domains to determine specific time intervals where the frequency needs to be adjusted for an RF signal in order to control a profile of the RF plasma sheath, in one implementation.

The voltage data measured by the power sensor is used to plot a frequency-amplitude graph for the modified RF signal, which is a combination of a plurality of RF signals generated by the different RFGs. FIG. 5A illustrates one example frequency-amplitude graph 402 plotted for an example modified RF signal. The raw data identifies the combined RF current (i.e., I), which includes one or more of LF RF currents and/or one or more of HF RF currents, conveyed through the power rod 102. Knowing the resistance R of the conductor element 106b, the voltage V can be easily determined by using the relationship V=IR. The frequency-amplitude graph is used to determine when the amplitude of the modified RF signal reaches a constant, steady state—i.e., remains fairly flat. It should be noted that the amplitude of the modified RF signal may not reach a truly steady state and there may be variations in the amplitude caused by the harmonics of each of the RF signals that make up the modified RF signal, as shown in box 401 in FIG. 5A. The amplitude of the modified RF signal, in some implementation, is said to have reached a steady state, when the variations caused by the harmonics are within a pre-defined threshold range. The frequency of the modified RF signal when the amplitude reaches a steady state is at about 60 MHz and beyond.

Figure 5B:
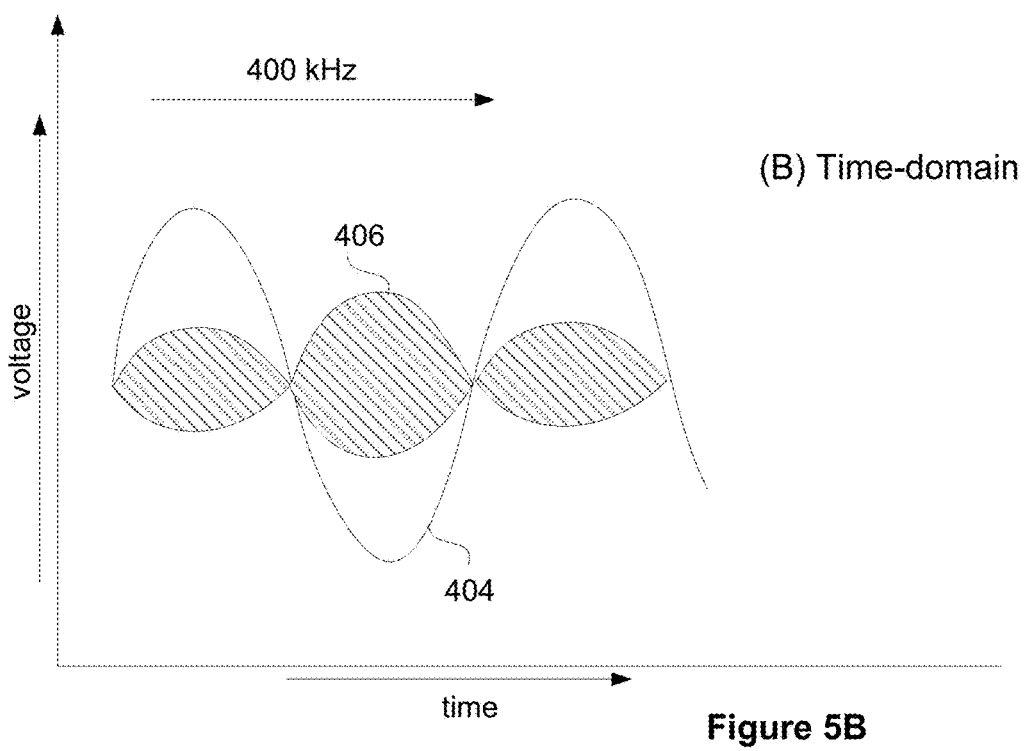

FIG. 5B illustrates a time-domain graph generated for a specific RF signal of the modified RF signal of about 400 kHz (operation 460 of FIG. 4B) from the raw data used to generate the frequency-amplitude graph of FIG. 5A. The time-domain graph is generated by analyzing the raw data to identify time-variant attributes of each of the RF signals that is part of the modified RF signal. The time-domain graph depicts voltage or current expressed as a function of time (i.e., the changes in the voltage or current of each of the RF signal over time). In FIG. 5B, line 404 represents changes in the voltage/current applied to the lower electrode 109b(i.e., the current in the forward direction), and region 406 represents an overlap of changes in the voltage/current from the forward current to the lower electrode 109b and the reflective current from the lower electrode 109b, over time. The time-domain graph for each of the RF signal of the modified RF signal is examined to determine when the variation in the amplitude of the respective RF signal can be trusted (i.e., becomes steady). The variation in the amplitude, in one implementation, is considered to be trusted (i.e., in a steady state) when the variations caused by the harmonics of the respective RF signal fall within a threshold range. When the voltage of the respective RF signal is identified to be in a trusted state, the data related to the respective RF signal used to generate the time-domain are used to generate a frequency domain (operation 470 of FIG. 4B).

Figure 5C:
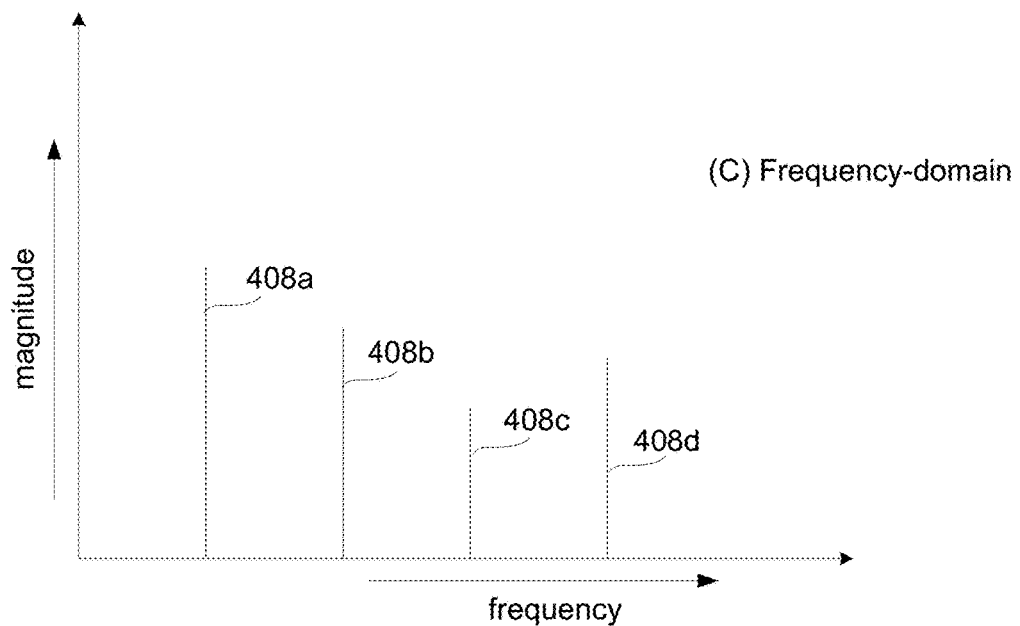

FIG. 5C illustrates an example of a frequency-domain graph generated for the modified RF signal for which time-domain graph was generated in FIG. 5B. The frequency-domain graph shows the relationship of the magnitude to the frequency of the different RF signals (i.e., how much of the different RF signals of the modified RF signal lies within each given frequency band, wherein each frequency band covers a range of frequencies). Transforms are used to convert the raw data of each RF signal used to generate the time-domain graph to generate the frequency-domain graph. In one implementation, a Fourier transform may be used to convert a time function into corresponding frequency components that are used to visualize the modified RF signal. The transform correlates the frequencies of the frequency-domain graph to corresponding time intervals of the different RF signals (i.e., time-variant attributes of the corresponding RF currents) in the time-domain graph. The frequency-domain graph shown in FIG. 5C is a simplified version with four different frequency bands, 408a-408d, that cover a range of frequencies.

Figure 5D:
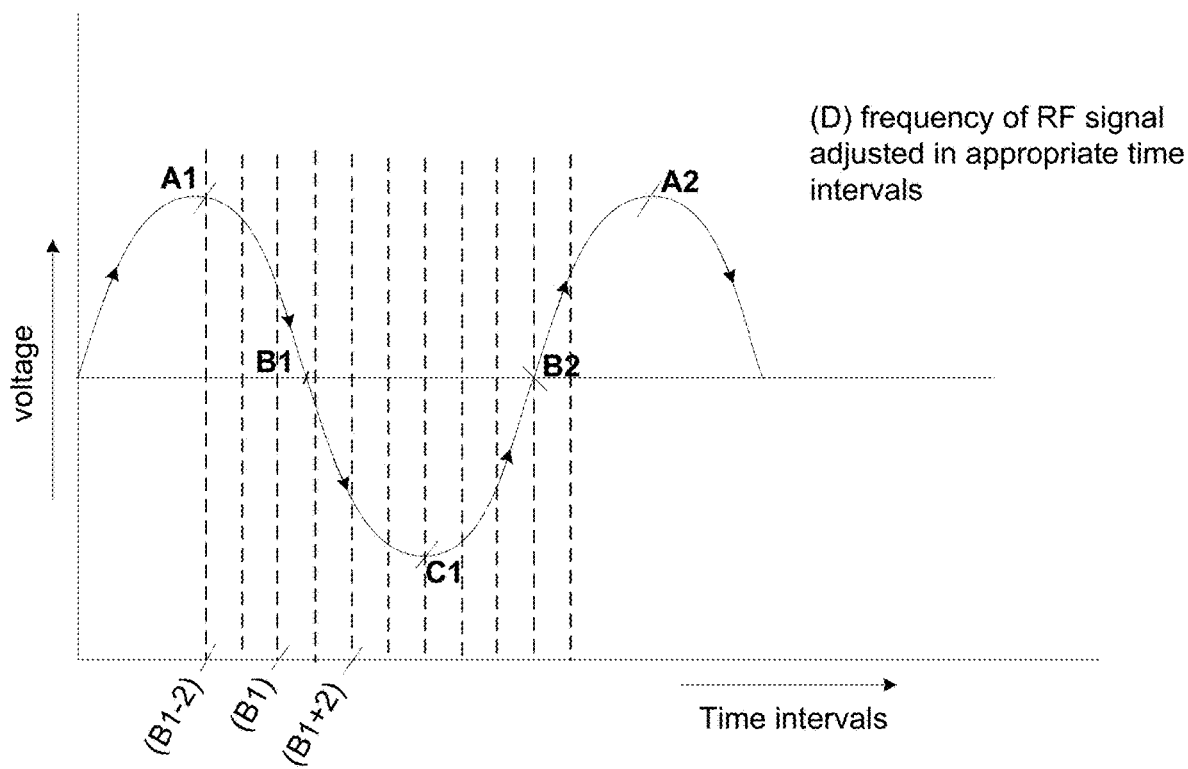

FIG. 5D illustrates using the relationship information from the time-domain and frequency-domain of the modified RF signal to identify specific portions (i.e., time intervals) of a specific RF signal of the modified RF signal to adjust in order to influence a sheath profile of RF plasma defined in the plasma chamber 100 (operation 480 of FIG. 4B). In order to identify the range of time intervals, in some implementations, for a specific RF signal associated with the time-domain and the frequency-domain, a cycle of the specific RF signal associated with a specific RF current is divided into a plurality of time intervals of equal size. The size (i.e., magnitude) of the time intervals is defined based on the level of tuning that needs to be performed to the specific RF signal, and the level of tuning may be based on the sheath profile of the plasma formed over the wafer and the amount of tuning that needs to be done to obtain the desired sheath profile. After sub-dividing the specific RF signal, a particular range of time-intervals is identified, based on the analysis of the time-domain and the frequency-domain, and the specific RF signal is fine-tuned at the particular range of time-intervals (operation 490 of FIG. 4B). In the implementation illustrated in FIG. 5D, the specific RF signal represented as a sinusoidal curve includes signal high points at A1, A2, etc., signal low points at C1, etc., and mid-points B1, B2, etc., where the downward (i.e., negative) or upward (i.e., positive) crossovers occur. The specific range of time interval identified for fine-tuning the frequency of the specific RF signal may correspond with the downward slope of the specific RF signal—e.g., the time interval range from B1−2 to B1+2 that are closest to the downward crossover point B1 (i.e., the descending portion of the specific RF signal). The frequency may be modified by sending a signal to the corresponding RF power supply by the controller 120. After modifying the frequency of the specific RF signal at the time interval range, the plasma sheath profile defined on the surface of the wafer is verified.

Figure 5E:
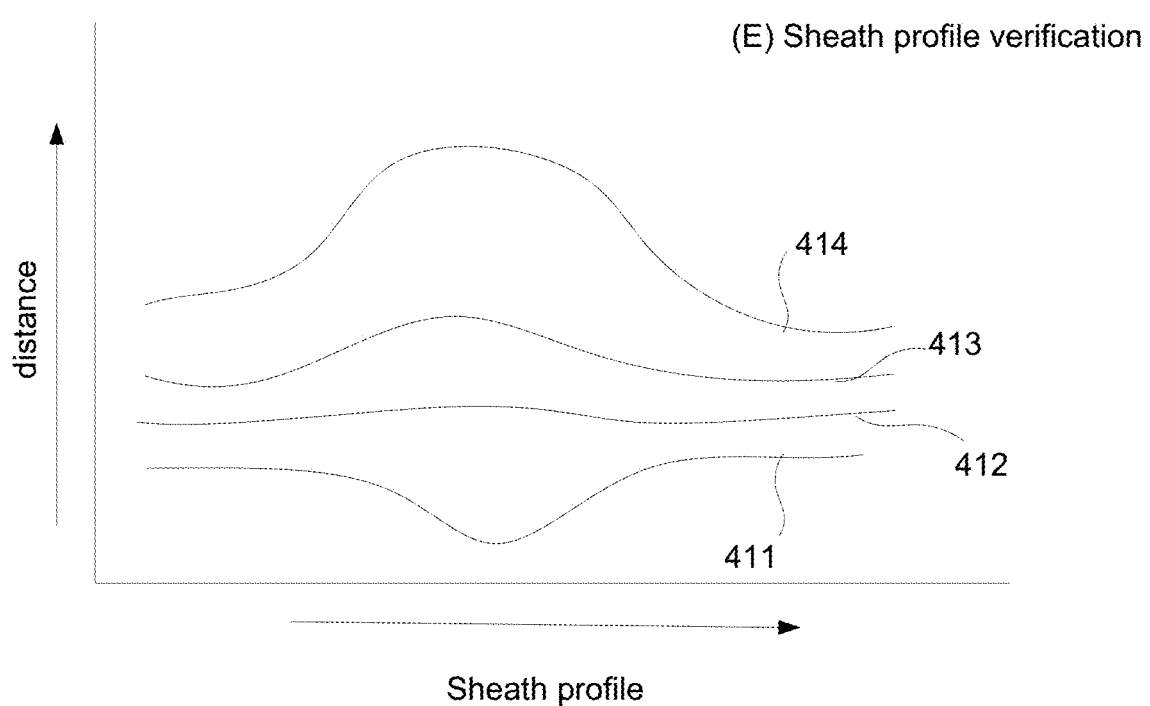

FIG. 5E illustrates the different sheath profiles of RF plasma that may be generated as a result of the frequency of the modified RF signal and adjustments to the plasma sheath profile may be made by adjusting the frequency/frequencies of specific ones of the RF currents that are used to generate the modified RF signal. For example, the plasma sheath may have a negatively pronounced profile (i.e., the profile that is extending downward) in the center, as shown in sheath profile 411, or may have a more even or flat profile, as shown in sheath profile 412, or may have lesser positively pronounced profile in the center, as shown in sheath profile 413, or may have a more positively pronounced profile (i.e., the profile that is extending upward) in the center, as shown in sheath profile 414. In some implementation, a substantially flat sheath profile, or a less positively pronounced profile may be desired over the wafer. Based on the type of sheath profile desired over the wafer, different time interval range may be identified for fine-tuning the one or more specific RF signals. The process of using the raw data from the controllers 1 and 2 (CTRL 1 110, CTRL 2 120) to determine the steady state of the modified RF signal, generating the time-domain for each RF signal and the frequency domain of the modified RF signal, sub-dividing one or more of the specific RF signals into a plurality of time intervals, identifying the specific range of time intervals to fine-tune, fine-tuning the specific RF signals at the identified specific range of time intervals, and verifying the profile of the resulting plasma sheath are done iteratively, till the desired plasma sheath profile is generated for the plasma in the plasma chamber 100. The size of the time interval dividing the one or more specific RF signals may be determined based on amount of fine-tuning that needs to be done to the specific RF signal(s). The adjustments to the frequency of the specific RF signal(s) may be stored in memory of the computer 125 as part of process recipe and may be applied to the specific RF signal as part of the modified RF current applied to the lower electrode 109b. Thus, based on the process recipe, the RF signal (e.g., one or more of just the HF RF signals, one or more of just the LF RF signals, or a combination of the HF and LF RF signals) and the adjustments to the RF signals are received at the matching network 104, where the RF signals are combined and the impedance of the load matched with the source to output the modified RF signal that is provided to the lower electrode 109b. The modified RF signal with the adjustment results in generating the desired plasma sheath profile over the wafer, when the wafer is received for processing. The various embodiments describe ways in which the fine-tuning of the plasma sheath profile can be performed by adjusting the at least one attribute (e.g., frequency) of specific one or more of the RF currents at a micro-level for specific time interval range, instead of trying to adjust the frequency of the modified RF signal, which may result in marginal changes to the plasma sheath profile. This micro level ability to adjust attributes of the RF current applied to the plasma chamber allows for better control of the plasma sheath profile and achieve better etch uniformity on the wafer surface.

Figure 6A:
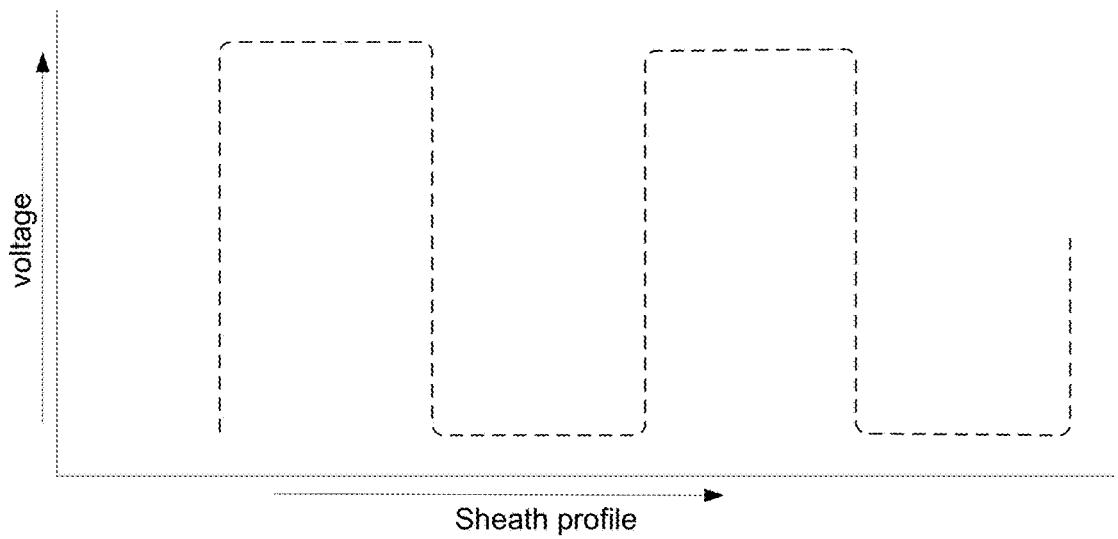
FIGS. 6A-6B illustrate the profile of the plasma sheath as it corresponds to the frequency distribution of the RF current, in accordance with one implementation.
Figure 6B:
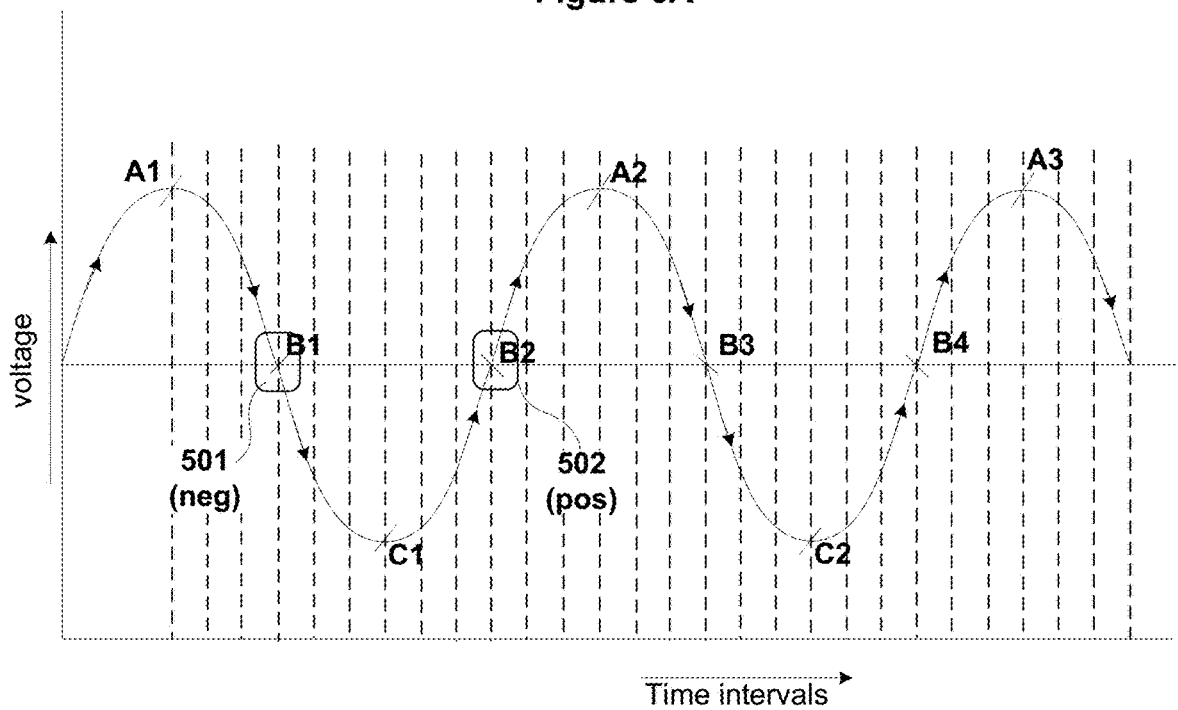

FIG. 6A shows an example sheath profile generated by a RF signal of a particular frequency, and FIG. 6B illustrates the time varying waveform of the RF signal that corresponds with the sheath profile of FIG. 6A. The rise and fall in the sheath profile is inversely related to the rising and falling portion of the RF signal. For example, the rise in the sheath profile corresponds with the descending portion of the time/amplitude graph of the RF signal and the fall in the sheath profile corresponds with the ascending portion of the time/amplitude signal of the RF signal that generated the sheath profile. In the example illustrated in FIGS. 6A and 6B, the high point of the sheath profile may be at the negative crossover point (i.e., the descending portion) of the RF signal and the low point of the sheath profile may be at the positive crossover point (i.e., the ascending portion) of the RF signal. Thus, based on the sheath profile desired over the wafer, specific time intervals of the RF signal may be identified for fine-tuning. As illustrated in FIGS. 6A and 6B, the time intervals identified for fine-tuning may be closer to the ascending portion (i.e., corresponding with positive cross-over) or the descending portion (i.e., corresponding with negative cross-over) of the RF signal.

Advantages of the various implementations described herein include detecting intensity (i.e., a feature) of the magnetic field generated from the RF current at the power rod, for different time variants, and identifying specific time variants in which the frequency of specific ones of the RF current delivered to the electrode has to be adjusted in order to control the plasma sheath profile formed over a surface of a wafer. In some cases, the plasma sheath profile may be better controlled by fine-tuning specific ones of the RF signals at time intervals that correspond with the downward slope (i.e., time intervals that are close to negative cross-over). In other cases, the plasma sheath profile may be better controlled by fine-tuning specific ones of the RF signals at time intervals that correspond with the upward slope (i.e., time intervals that are close to positive crossover). The delivery of RF power may be controlled by decreasing the RF power delivery or by increasing the RF power delivery to the electrode at the specific time intervals. The magnetic field sensor along with other power sensors may be used to precisely capture the features of the magnetic field and the attributes of the RF current delivered to the electrode at different time intervals so that specific time variants and attributes of the RF signal that needs to be targeted for tuning can be precisely identified and adjusted. The precise identification of the attributes of the RF current for fine-tuning ensures that only those attributes of specific ones of the RF current that influence the distribution of the plasma sheath are fine-tuned, making this an effective way of controlling the sheath profile of the plasma, so as to optimize plasma process results on the surface of the wafer.

Embodiments described herein may be practiced with various computer system configurations including hand-held hardware units, microprocessor systems, microprocessor-based or programmable consumer electronics, minicomputers, mainframe computers and the like. The embodiments can also be practiced in distributed computing environments where tasks are performed by remote processing hardware units that are linked through a network.

In some embodiments, the controllers 110 and 120 may be part of a system, which may be part of the above-described examples. Such systems include semiconductor processing equipment, including a processing tool or tools, process chamber(s) including plasma chamber(s), a platform or platforms for processing, and/or specific processing components (a wafer pedestal, a gas flow system, etc.). These systems are integrated with electronics for controlling their operation before, during, and after processing of a semiconductor wafer or substrate. The controllers are represented by electronics, which may control various components or sub-parts of the system or systems. The controller, depending on the processing requirements and/or the type of system, is programmed to control any of the processes or components associated with the process recipe disclosed herein, including the delivery of process gases, temperature settings (e.g., heating and/or cooling), pressure settings, vacuum settings, power settings, RF generator settings, RF matching circuit settings, frequency settings, flow rate settings, fluid delivery settings, positional and operation settings, wafer transfers into and out of a tool and other transfer tools and/or load locks coupled to or interfaced with a system.

Broadly speaking, in a variety of embodiments, the controller is defined as electronics having various integrated circuits, logic, memory, and/or software that receive instructions, issue instructions, control operation, enable cleaning operations, enable endpoint measurements, and the like. The integrated circuits include chips in the form of firmware that store program instructions, digital signal processors (DSPs), chips defined as ASICs, PLDs, and/or one or more microprocessors, or microcontrollers that execute program instructions (e.g., software). The program instructions are instructions communicated to the controller in the form of various individual settings (or program files), defining the parameters, the factors, the variables, etc., for carrying out a particular process on or for a semiconductor wafer or to a system. The program instructions are, in some embodiments, a part of a recipe defined by process engineers to accomplish one or more processing steps during the fabrication of one or more layers, materials, metals, oxides, silicon, silicon dioxide, surfaces, circuits, and/or dies of a wafer.

The controllers, in some embodiments, are a part of or coupled to a computer that is integrated with, coupled to the system, otherwise networked to the system, or a combination thereof. For example, the controllers may be in a "cloud" or all or a part of a fab host computer system, which allows for remote access of the wafer processing. The computer enables remote access to the system to monitor current progress of fabrication operations, examines a history of past fabrication operations, examines trends or performance metrics from a plurality of fabrication operations, to change parameters of current processing, to set processing steps to follow a current processing, or to start a new process.

In some embodiments, a remote computer (e.g. a server) provides process recipes to a system over a network, which includes a local network or the Internet. The remote computer includes a user interface that enables entry or programming of parameters and/or settings, which are then communicated to the system from the remote computer. In some examples, the controller receives instructions in the form of data, which specify the parameters, factors, and/or variables for each of the processing steps to be performed during one or more operations. It should be understood that the parameters, factors, and/or variables are specific to the type of process to be performed and the type of tool that the controller is configured to interface with or control. Thus as described above, the controller is distributed, such as by including one or more discrete controllers that are networked together and working towards a common purpose, such as the processes and controls described herein. An example of a distributed controller for such purposes includes one or more integrated circuits on a chamber (e.g., plasma chamber) in communication with one or more integrated circuits located remotely (such as at the platform level or as part of a remote computer) that combine to control a process on the chamber.

Without limitation, in various embodiments, example systems to which the methods are applied include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that is associated or used in the fabrication and/or manufacturing of semiconductor wafers.

It is further noted that in some embodiments, the above-described operations apply to several types of plasma chambers, e.g., a plasma chamber including an inductively coupled plasma (ICP) reactor, a transformer coupled plasma chamber, conductor tools, dielectric tools, a plasma chamber including an electron cyclotron resonance (ECR) reactor, etc. For example, one or more RF generators are coupled to an inductor within the ICP reactor. Examples of a shape of the inductor include a solenoid, a dome-shaped coil, a flat-shaped coil, etc.

As noted above, depending on the process step or steps to be performed by the tool, the host computer communicates with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

With the above embodiments in mind, it should be understood that some of the embodiments employ various computer-implemented operations involving data stored in computer systems. These operations are those physically manipulating physical quantities. Any of the operations described herein that form part of the embodiments are useful machine operations.

Some of the embodiments also relate to a hardware unit or an apparatus for performing these operations. The apparatus is specially constructed for a special purpose computer. When defined as a special purpose computer, the computer performs other processing, program execution or routines that are not part of the special purpose, while still being capable of operating for the special purpose.

In some embodiments, the operations may be processed by a computer selectively activated or configured by one or more computer programs stored in a computer memory, cache, or obtained over the computer network. When data is obtained over the computer network, the data may be processed by other computers on the computer network, e.g., a cloud of computing resources.

One or more embodiments can also be fabricated as computer-readable code on a non-transitory computer-readable medium. The non-transitory computer-readable medium is any data storage hardware unit, e.g., a memory device, etc., that stores data, which is thereafter be read by a computer system. Examples of the non-transitory computer-readable medium include hard drives, network attached storage (NAS), ROM, RAM, compact disc-ROMs (CD-ROMs), CD-recordables (CD-Rs), CD-rewritables (CD-RWs), magnetic tapes and other optical and non-optical data storage hardware units. In some embodiments, the non-transitory computer-readable medium includes a computer-readable tangible medium distributed over a network-coupled computer system so that the computer-readable code is stored and executed in a distributed fashion.

Although the method operations above were described in a specific order, it should be understood that in various embodiments, other housekeeping operations are performed in between operations, or the method operations are adjusted so that they occur at slightly different times, or are distributed in a system which allows the occurrence of the method operations at various intervals, or are performed in a different order than that described above.

It should further be noted that in an embodiment, one or more features from any embodiment described above are combined with one or more features of any other embodiment without departing from a scope described in various embodiments described in the present disclosure.

Although the foregoing embodiments have been described in some detail for purposes of clarity of understanding, it will be apparent that certain changes and modifications can be practiced within the scope of appended claims. Accordingly, the present embodiments are to be considered as illustrative and not restrictive, and the embodiments are not to be limited to the details given herein.

What is claimed is:

1. A sensor subsystem configured to be disposed between an output of a matching network and an input of a power rod used for supplying radio frequency (RF) power to a plasma chamber, the sensor subsystem comprising:
   a magnetic field sensor including a tubular housing with a plurality of slots and having a conductor element disposed inside and along a length of the tubular housing; and
   a connection strap configured to electrically connect the output of the matching network to the power rod,
   wherein the tubular housing is oriented parallel to and spaced apart from the connection strap, and
   wherein the tubular housing is connected to a ground potential and the conductor element is configured to sense a magnetic field produced around the connection strap when said RF power is supplied to the plasma chamber.

2. The sensor subsystem of claim 1, wherein the tubular housing is oriented such that openings provided by the plurality of slots at least partially face the connection strap.

3. The sensor subsystem of claim 1, wherein the connection strap includes a portion that has a linear orientation, the portion being parallel to the tubular housing.

4. The sensor subsystem of claim 3, wherein a length of the portion corresponds to at least the length of the tubular housing.

5. The sensor subsystem of claim 1, wherein the magnetic field sensor is coupled to a first controller and the output of the matching network is coupled to a second controller.

6. The sensor subsystem of claim 5, wherein the first controller is distinct from the second controller.

7. The sensor subsystem of claim 5, wherein the second controller is integrated with the first controller.

8. A magnetic field sensor, comprising:
   a tubular housing connected to ground; and
   a conductor element disposed inside and along a length of the tubular housing, the conductor element is electrically isolated from the tubular housing,
   wherein the tubular housing includes a plurality of slots that expose the conductor element to a power rod spaced apart from the tubular housing and used to provide radio frequency (RF) power to a plasma chamber.

9. The magnetic field sensor of claim 8, wherein the magnetic field sensor is configured for placement parallel to the power rod that provides the radio frequency (RF) power to the plasma chamber.

10. The magnetic field sensor of claim 8, wherein the plurality of slots is defined on a side of the tubular housing, and
    wherein the magnetic field sensor is oriented such that the side of the tubular housing with openings of the plurality of slots face the power rod.

11. The magnetic field sensor of claim 8, wherein a distance of separation between the magnetic field sensor and the power rod is defined to enable the conductor element to detect magnetic field generated by the RF power.

12. The magnetic field sensor of claim 8, wherein the tubular housing is electrically grounded.

13. The magnetic field sensor of claim 8, wherein the plurality of slots allows the conductor element to detect magnetic fields generated by both a forward current and a reflective current.

14. The magnetic field sensor of claim 8, wherein size of the plurality of slots is defined to enable detection of a specific frequency of the RF power.

* * * * *